Dec. 11, 1951  J. T. McGARRY  2,578,143
WATER SERVICE APPARATUS
Filed Feb. 29, 1944  2 SHEETS—SHEET 2

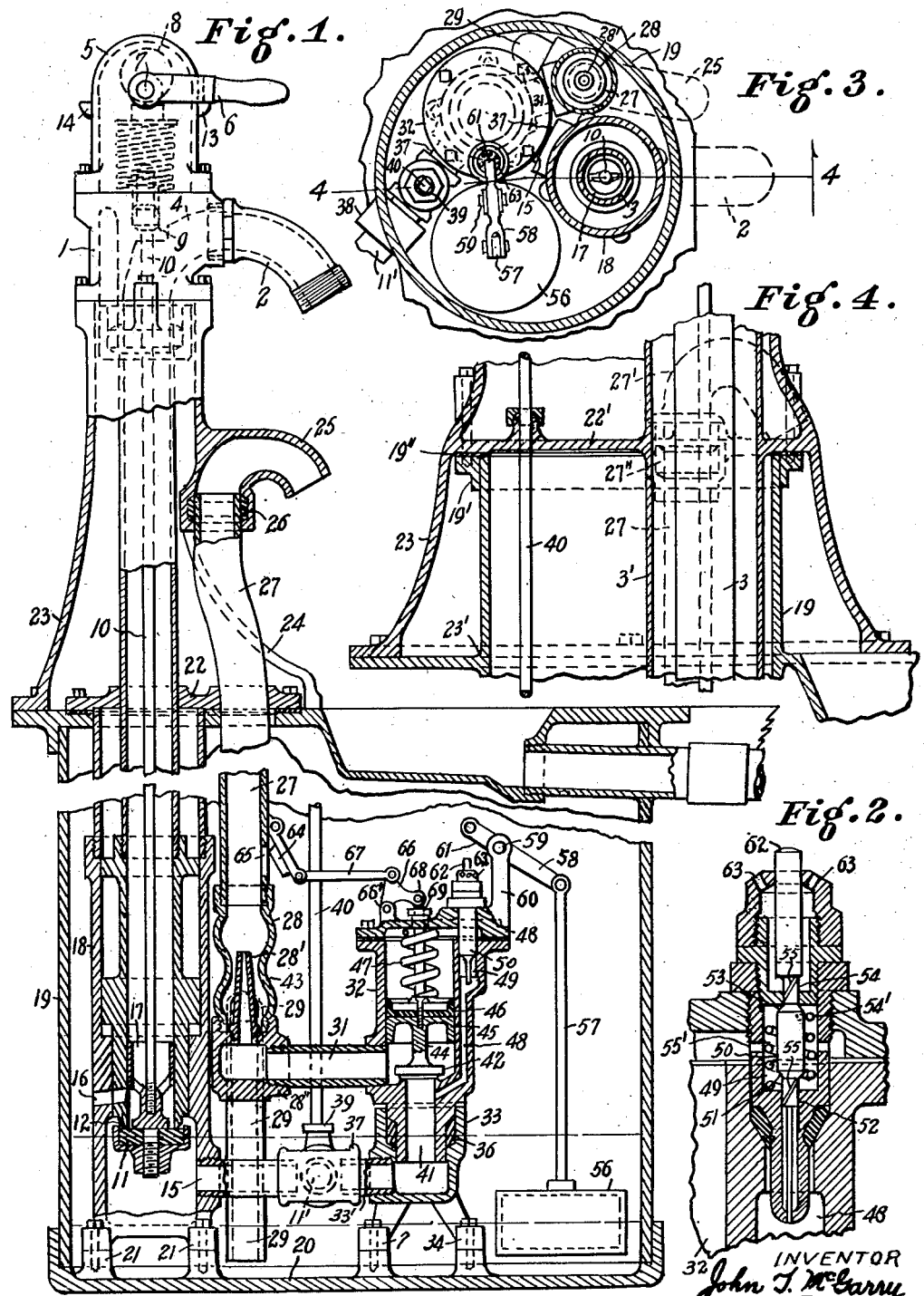

INVENTOR
John T. McGarry
BY
ATTORNEY.

Patented Dec. 11, 1951

2,578,143

UNITED STATES PATENT OFFICE 2,578,143

WATER SERVICE APPARATUS

John T. McGarry, Cincinnati, Ohio; Mary Frances McGarry, executrix of said John T. McGarry, deceased, assignor to Railroad Products Company, Cincinnati, Ohio, a corporation of Ohio Application February 29, 1944, Serial No. 524,392

8 Claims. (Cl. 137—13)

My invention relates to hydrants and the like, and more especially to such apparatus so exposed as to require precaution against freezing, and to require drainage of the residue of water in the riser after each taking of water.

An object of my invention is to avoid connection of the riser drainage means with a sewer or other receptacle for the drainage from which the riser and other parts contacted by the water to be used might be contaminated. Apparatus is known in the art in which the residue in the riser is drained into a reservoir, whence, at the next use of the apparatus, water from the main operates some forcing device to force the reservoir water out through the riser with the water now coming from the main through the riser. A further object of my present invention is to avoid passing the water from the reservoir through the riser, for still further effective sanitation; avoiding the use of the water that may have become too stale if standing too long in the reservoir in a long interval between uses of the apparatus. That is to say, the object is to force the reservoir water directly from the reservoir to the exterior of the apparatus, into the drain or other receptacle that finally disposes of the water. A further object is to insure against freezing of the parts involved in this direct expulsion of the reservoir water. A further object is to provide improved means whereby an aspirator, as the forcing means, is supplied with the forcing water from the main, and is governed to act after drainage water, or any other water entering the reservoir, has reached a predetermined height therein, so as to preclude any chance of any of this water entering the riser where water is drained from the riser into the reservoir. This action ordinarily will be at each operation of the apparatus as before mentioned; but it will be seen that the control is such that the aspirator acts at any time any water in excess of the predetermined safe height has entered the reservoir. A further object is to provide the control device for the aspirator of improved construction, enabling it to be properly responsive to rise of water while controlling the rather heavy pressure of the water.

Other objects will appear in the course of the following description, illustrated by the accompanying drawings, in which:

Figure 1 is a vertical sectional view, with the upper part in side elevation, of a hydrant embodying one example of my invention;

Fig. 2 is an enlarged sectional view of the means that controls the opening and closing of the aspirator valve in this example;

Fig. 3 is a plan view of the lower structure of the apparatus shown in Fig. 1, the casing being in cross section;

Fig. 4 is a vertical section, on line 4—4 of Fig. 3, of a part of the apparatus intermediate of its bottom and top parts, just above the ground in which the apparatus is embedded;

Figure 5:
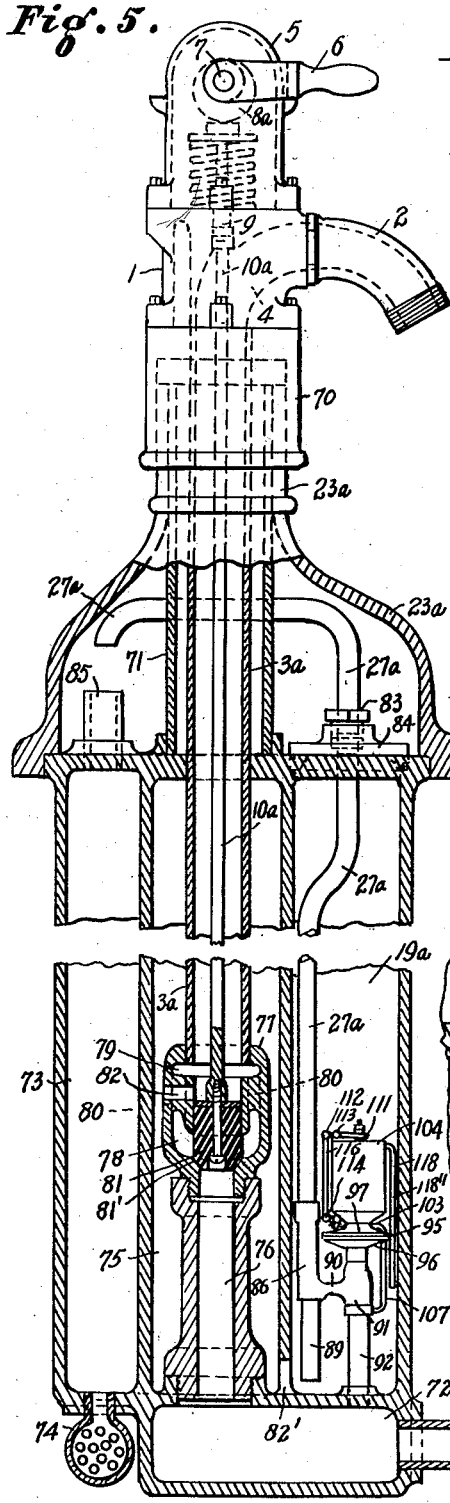
Fig. 5 is a vertical sectional view corresponding to Fig. 1, but showing a second example of my invention.

In the example of Figs. 1 to 4, inclusive, the true arrangement of parts, as preferred, is illustrated in Fig. 3; Fig. 1 having those parts appearing as in extended arrangement for purpose of clearness of each part, which is not had in Fig. 3 owing to the compact actual arrangement.

The structure above ground may be any suitable hydrant structure as of a head 1 from one side of which a spout 2 opens and into the bottom of which opens the riser 3 connecting through a curved duct 4 with the spout 2 as shown in Fig. 1. On the top of head 1 is housing 5 straddling which is a handle 6 with its members fixed to respective ends of shaft 7 that has these ends projecting outside the housing 5 where it extends across the interior of the housing. In this interior an eccentric 8 is fixed on shaft 7. Extending down through a stuffing box 9 from within the housing, under eccentric 8, is the main valve operating rod 10, entering the riser 3 and extending to the bottom thereof, below the ground, to connect with the main valve 11 which seats upward against an annular seat 12, on bottom of the riser 3. The eccentric 8 is so positioned relative to handle 6 on shaft 7 that when handle 6 is down at one end of the housing on stop 13 as shown, the main valve 11 is pulled tightly up to its seat 12; but if the handle 6 is thrown to the other end against stop 14 the main valve 11 is depressed away from seat 12 to allow the water to pass from main 15 up into the riser 3.

After this main valve is closed again, a residue of water is left in riser 3; and it drains out through drain port 16 in one side wall near the bottom of the riser; having been closed by a sleeve valve 17 fixed to and surrounding the operating rod 10 shortly up from main valve 11, which valve 17 is raised away from the drain port 16 as shown, when main valve is closed by ascent of operating rod 10 to which sleeve valve 17 is fixed. Then as soon as the next main valve opening begins, valve 17 begins to descend, closing port 16 so that live water from the main cannot escape therethrough.

The riser 3 and attached parts just described fits into a casing 18 which in turn sits in the reservoir casing 19; appearing as a tank-shaped object in Fig. 1 in distortion as before explained, but actually preferably being a true vertical tube as seen in plan in Fig. 3. This tube has a bottom 20 to which the riser casing 19 has feet 21 fixed, elevating it from the bottom or floor 20; and its top is fixed in a cover plate 22 bolted to the bottom plate of the pedestal 23 with which the upper structure before described is provided for securing it to its ground support. The riser 3 and attached parts may be drawn up out of casing 18 for servicing the main valve 15 and other parts, when the pedestal is unfastened from the ground support. This pedestail 23 has in one side, offset from spout 2 as seen in Fig. 3, a radial recess or slot 24, above which is the exterior drain spout 25 with a downwardly opening stuffing box 26 that receives the upper end of the upright drain pipe 27 extending, like riser 3, tightly up through the cover plate 22 as seen in Fig. 1.

This drain pipe 27 has its lower end connected with the top of the casing of the aspirator 28 of any well known suitable construction; the jet tube 28' inside the constricted casing 28'' being clearly seen in Fig. 1. Downward from casing 28'' leads suction tube 29 ending close to the floor 20 of the reservoir. From a side of aspirator casing 28'' leads the aspirator supply pipe 31 into one side bottom port of a cylinder 32 which rests on a base 33 elevated on legs 34 on the reservoir floor 20, with a bottom port 35 having sealed connection with the interior of base 33 by means of stuffing box 36. From one side of the bottom of this base 33 leads the cylinder supply nipple 33' connecting with a leg of T 37, the continuing leg connecting with the nipple, which has been called the main 15. The third leg of the T 37 connects through the boss 38 on the reservoir wall, as in Fig. 3, with the actual main 11', which is understood to lead from the waterworks or other supply of water under pressure. So that this water may be turned off from above ground, when parts are to be removed as before mentioned, a valve 39 between main 11' and T 37 has a stem 40 understood to extend up to the ground for access.

Up from space in base 33 at nipple 33' leads a port 41 in the bottom extension of cylinder 32, which can communicate with the side aspirator supply pipe 31 unless closed by the disk valve 42 as shown. Supply pipe 31 discharges through jet tube 28' as restricted in the chamber 43 formed in the lower part of aspirator casing 28''; while the suction tube 29 enters the side of casing 28'' above and distinct from this bottom chamber 43. Thus water admitted to jet tube 28' can draw water up through suction tube 29 and raise it through drain pipe 27 to the exterior of the apparatus. This, as before mentioned, is to occur when water in the reservoir reaches its maximum permissible height; which is well below where it could enter the riser drain port 16 and into riser 3. For this, valve 42 connects by upstanding stem 44 with plunger 45 sliding up and down inside cylinder 32 with packing 46, and under pressure of spring 47 between it and top 48 of the cylinder, normally to hold disk valve 42 closed on port 41 against the water main pressure. This however will not be strong enough.

For this reason means is provided for causing some of the high pressure water itself to act on plunger 45, which being of a greater area than disk valve 42, very firmly seats this valve when the aspirator is not to be operated. A narrow duct 48 leads from cylinder bottom port 41 up in the cylinder wall into a valve chamber 49 containing a valve member 50 that is cylindrical and loose in chamber 49 on an upright axis and has a lower conical end or seat 51 with an axially projected pin 52, and an upper conical end or seat 53 with a like pin 54. These pins are guided snugly in passages in the ends of chamber 49, and have grooves 55 to allow passage of water if the respective conical end 51 or 53 is off its seat at the respective end of chamber 49. A spring 54' around the valve member 50 normally keeps it upward against its top seat to allow water to flow from duct 48 through top ports 55' of cylinder 32 to the space above plunger 45, keeping disk valve tightly closed since plunger 45 has much greater area than cylinder bottom port 41 and closing part of valve 42.

But as the water rises in the reservoir, it raises the float 56 hung by stem 57 on one longer outer arm of a lever 58 fulcrumed at 59 on a post 60 of the cylinder cover 48, while the other arm 66 or the inner shorter one, may press down on a pin 62 slidable down in perforate top 63 of the valve casing, to depress valve member 50, closing duct 48 with its lower end and opening at the upper seat so that water can flow out from above plunger 45 into the reservoir as the high pressure water acts on disk valve 42 to raise the plunger. Disk valve 42 thus fully opens and admits live water from bottom port 41 to flow through supply pipe 31 and operate the aspirator jet tube 28' and raise water from the reservoir by way of drain pipe 27 as before explained. As the water is depleted the float 56 falls and by lever 58 releases pin 62 so that spring 54 raises valve member 50 to its top seat, closing the top of the cylinder 32 to escape of water. Raising valve member 50 withdraws it from its lower seat again to admit high pressure water from the duct 48 into the top of the cylinder 32 to depress plunger 45 and disk valve 42, seating the latter powerfully on its seat at top of port 41 and stopping the flow of water to the aspirator and so stopping its operation to lift water from the reservoir.

As the drain or discharge pipe 27 must be well drained after each operation, so that the water in it at stoppage of the aspirator will not remain and freeze in it, or flow too slowly from it, in which case it might freeze in very cold weather, I provide auxiliary outlet means for this pipe 27. An auxiliary valve 64 covers an ample outlet port 65 in the side of pipe 27 just above the aspirator; being, as here shown, hinged above port 64 to close downwardly and open upwardly. A lever 66 is fulcrumed on post 66' on the cover of the cylinder, with one end connected to valve 64 by link 67 having its other end connected to a rod 68 extending through a stuffing box 69 in the cylinder head and connected to plunger 45 within cylinder 32. Thus, when aspirator valve 42 opens, auxiliary valve 64 is closed, preventing leakage of drain pipe 27; but soon as the aspirator valve is closed, valve 64 is opened, permitting rapid drainage of all residue from the drain pipe 27.

Figure 6:
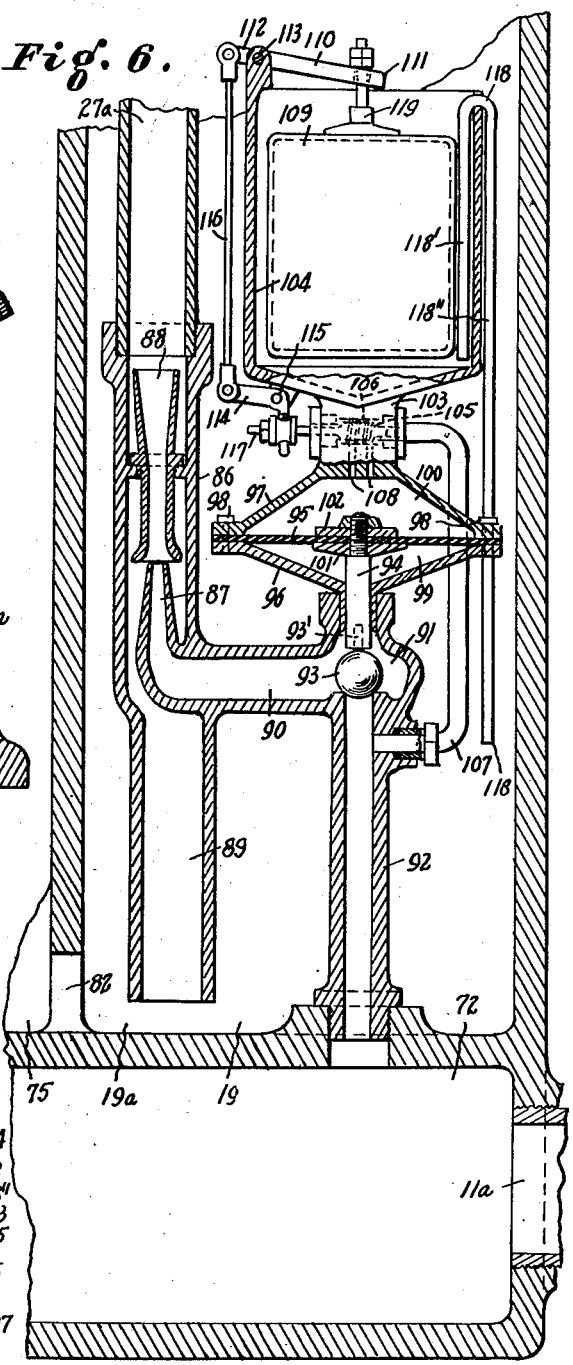
Fig. 6 is a like section, enlarged, to show the device that controls the aspirator in this second example.

In the second example, Figs. 5 and 6, the top portions of the apparatus are generally similar to those of the first example, Figs. 1 to 5, inclusive. However, in this example, the design calls for the main valve opening upwardly as will be explained later; so that the top parts are modified so eccentric 8a pushes operating rod 10a downward instead of upward, to open the main valve. A cup 70 fitting over and around the top of modified pedestal 23a, the upper neck of which closely embraces a jacket tube 71, the bottom end of which fits snugly in the top of the lower structure, to be described, where the latter is at ground level. This jacket tube 71 encloses an insulating air space around the riser 3a, further insuring against films of water, after drainage, adhering by freezing on the riser walls.

The lower structure as here exemplified is an assemblage of three chambers vertically parallel, and a fourth chamber under the bottom of two of the three. This last is the inlet chamber 72 is entered at one side by the water main 11a. At the right as seen, the first upright chamber is the reservoir 19a; at the left is the drainage-disposing chamber 73 which has leading from its bottom a strainer 74 through which the chamber may drain into the surrounding soil. The central chamber 75 is the casing for the riser 3a. An upright hollow pedestal 76 has its bottom communicating with the bottom inlet chamber 72, and on its top it supports the main valve casing 77 into the top of which enters the bottom of the riser 3a to communicate with a set of annular ports 78 and 79 joined vertically by side ports 80 within the walls of casing 77, these ports communicating with the interior of hollow pedestal 76 if the main valve 81 is raised off its seat 81' where the ports have their connection with this pedestal interior. This main valve 81 here is cylindrical and is fixed to the lower end of the operating rod 10a that leads up to the eccentric 8a for operation.

In one side of the valve casing 77 is the drain port 82 which will permit drainage of water from riser 3a if the main valve 81 is down and closed, as seen; but will be closed by the middle straight cylindrical portion of the valve, which fits snugly the valve casing bore, when this valve 81 is raised to admit live water to the riser. When this port is open, the drainage passes through port 82 into the riser casing 75 and from there through a further drain port 82' in the bottom part of its side wall, into the reservoir chamber.

The drain pipe 27a here extends from the top of the aspirator casing, up through the closed top of the assemblage of chambers with a stuffing box 83 where it passes through the removable lid 84 of the assembly top. It then passes transversely at one side of the riser and jacket and curves down to open into the entrance nipple 85 of the drainage disposal chamber 73.

The aspirator casing comprises the main body 86 in which is the jet tube 87 opening up into the nozzle 88 hung inside the body 86. The suction tube 89 leads from space around the jet tube to stop near the bottom of reservoir chamber 19a. The aspirator supply pipe 90 leads across from the aspirator-control-valve chamber 91 through the wall of asiprator body 86 to the entrance of jet tube 87. Valve chamber 91 is at the top of vertical pipe 92 by which it communicates with the inlet chamber 72 through the reservoir bottom. The top end of this pipe 92 forms the seat for a ball valve 93 having a small stem 93' fitting slidingly up in the bottom end of operating pin 94 having its top end connected to a flexible diaphragm 95, held between two cones.

The lower cone 96, flaring upward, has its center communicating with the top of ball valve chamber 91; and the upper cone 97 flares downward; the periphery of the diaphragm 95 being clamped between the peripheries of the two cones by screws 98, so that a lower chamber 99 and an upper chamber 100 are defined. The diaphragm is of flexible material such as leather, rubber or any like composition, forming a gasket between cone peripheries and making the chambers 99 and 100 watertight from each other. The operating pin 94 connects to the center of the diaphragm 95 in watertight manner by the washers 101 and 102.

The upper cone 97 has a large hub 103 with its top fixed to and supporting the float chamber 104. This hub 103 forms the casing for a small shifter valve 105, understood to be like, in construction and operation, the valve with the member 50 and associated parts of the first example, best seen in Fig. 2. It has a spring 106 that normally seats it to the left, leaving duct pipe 107 open from vertical pipe 92 whence pressure water from chamber 72 thus can flow in and down through ports 108 against the diaphragm 95 to flex it downward and cause pin 94 to seat ball valve 93 and shut off the pressure water from the aspirator; these being the positions of the parts shown in Fig. 6. At this time the other end of shifter valve 105 is seated so that the pressure water is confined to act as just explained. To shift the valve 105 a float device in and on the float chamber 104 is connected to the valve.

This device comprises the float 109, a lever 110 with an inner longer arm 111 and an outer shorter arm 112, with its fulcrum 113 on the rim of the chamber 104, a bell crank 114 fulcrumed at 115 on the bottom of the chamber with one arm outward and connected to the upper lever outer short arm by a rod 116, and with its other arm depending and articulated with a stem 117 on the left end of shifter valve 105. A siphon 118 hooks over a wall of float chamber 104 with its short leg 118' between the float 109 and the chamber wall and ending near the bottom of the chamber, and its long leg 118" depending outside the chamber wall and at one side of the cone assembly and ending some distance therebelow. This is for emptying the float chamber as water is drawn up out of the reservoir chamber 19a. As water drains into this chamber 19a from the riser 3a, it will flow over the rim of the float chamber 104 into this chamber, raising float 109 and forcing, or permitting spring 106 to force, the shifter valve 105 to the right. This operation does not begin until the shoulder 119 on the float stem engages up against the upper lever inner arm 111. The duct pipe 107 thus is closed, and at the left the shifter valve 105 unseats and allows water to escape from above diaphragm 95 into reservoir chamber 19a, while the pressure water from vertical pipe 92 unseats ball valve 93 since it can, by means of pin 94 flex diaphragm 95 upward under the atmospheric pressure.

Ball valve 93 being unseated, the pressure water flows to the aspirator and operates it, drawing the water up out of reservoir chamber 19a and discharging it through drain pipe 27a into drainage disposal chamber 73. As the water level falls in reservoir chamber 19a, the water that had raised the float 109 is withdrawn from float chamber 104 into the siphon 118 and to the reservoir chamber 19a, allowing float 109 to fall. This shifts the shifter valve 105 to the left, admitting pressure water through duct pipe 107 above diaphragm 95, flexing it downward and seating ball valve 93 firmly owing to the much greater area of the diaphragm than that of the ball valve. The seated ball valve 93 stops the pressure water from flowing to the aspirator, ending the discharge from the reservoir chamber 19a.

The drain port of riser 3a is considerably more elevated than is the top of float chamber 104 where further water entering the chamber 19a must flow into the float chamber which has been depleted of water by the preceding aspirator-stopping action just described; that rise of reservoir water is very sudden, not depending upon the more gradual rise of the float and its action to start the aspirator. This provision is especially valuable in this improved apparatus, where it especially is desired to exclude all reservoir water from the riser 3a.

Fig. 4 of the first example discloses a precaution against floods of ground water, as occur in heavy storms, entering casing 19 to flood the reservoir possibly more rapidly than the control device and aspirator can act to prevent rising of reservoir water to the riser drain port 16. Casing 19 extends up and is water tight with surrounding pedestal 23 at 23', and has a top rim 19' with a gasket 19" seating cover plate 22' attached in water tight manner to the inner walls of pedestal 23. The riser casing 3' and packing of shut-off valve stem 40 are likewise water tight with cover plate 22'. Drain discharge spout 27' is water tight with the upper side of plate 22', and connects with its pipe 27 by stuffing box 27". Wherever water tight connection is mentioned, it will be understood this may be by welding or the like. Also, it will be understood that the above described flood precaution may be provided for the apparatus exemplified in Figs. 5 and 6.

Modifications other than instanced may occur, and what I claim as new and desire to secure by Letters Patent is:

1. Water service apparatus comprising a riser and means below ground level for admitting water under raised pressure to the apparatus to be passed upward through the riser for use, and comprising a reservoir below the ground level, the riser having a drain outlet through which drainage passes from the riser down into the reservoir for storage between uses of the apparatus, forcing means operated by fluid under raised pressure to displace the drainage upward from the reservoir, control means to cause starting and stopping for said forcing means, said apparatus comprising disposal means separate and distinct from the riser whereby the drainage is conducted upwardly to the exterior of the apparatus without intermixing of the drainage with the water in the riser, and means for receiving the discharged drainage, spaced down from the outlet of the disposal means, whereby matter is precluded from passing from the receiving means into said disposal means, reservoir and riser.

2. Water service apparatus comprising a riser and means below ground level for admitting water under raised pressure to the apparatus to be passed upward through the riser for use, and comprising a reservoir below the ground level, the riser having a drain outlet through which drainage passes from the riser down into the reservoir for storage between uses of the apparatus, forcing means operated by fluid under raised pressure to displace the drainage upward from the reservoir, control means to cause starting and stopping of said forcing means, said control means being actuated by the rise and fall of the drained water in the reservoir, the control means being so constructed and arranged relative to the riser drain outlet that rise of the drainage in the reservoir is stopped at an ample distance downward from said drain outlet, for beginning of discharge of the drainage up out of the reservoir, said apparatus comprising disposal means separate and distinct from the riser whereby the drainage is conducted upwardly to the exterior of the apparatus without intermixing of the drainage with the water in the riser.

3. Water service apparatus comprising a riser and means below ground level for admitting water under raised pressure to the apparatus to be passed upward through the riser for use, and comprising a reservoir below the ground level, the riser having a drain outlet through which drainage passes from the riser down into the reservoir for storage between uses of the apparatus, forcing means operated by fluid under raised pressure to displace the drainage upward from the reservoir, control means to cause starting and stopping of said forcing means, said control means comprising a valve opened or closed to respectively admit or exclude the above mentioned forcing fluid under raised pressure to or from the force exerting means, a float, and intermediate means operatively relating said float to said valve, so constructed and arranged relative to the riser drain outlet that rise of the drainage in the reservoir is stopped at an ample distance downward from said drain outlet, for beginning of discharge of the drainage up out of the reservoir, said apparatus comprising disposal means separate and distinct from the riser whereby the drainage is conducted upwardly to the exterior of the apparatus without intermixing of the drainage with the water in the riser.

4. Water service apparatus comprising a riser and means below ground level for admitting water under raised pressure to the apparatus to be passed upward through the riser for use, and comprising a reservoir below the ground level, the riser having a drain outlet through which drainage passes from the riser down into the reservoir for storage between uses of the apparatus, forcing means operated by fluid under raised pressure to displace the drainage upward from the reservoir, control means to cause starting and stopping of said forcing means, said control means comprising a valve opened or closed to respectively admit or exclude the above mentioned forcing fluid under raised pressure to or from the force exerting means, a float, an intermediate means operatively relating said float to said valve, so constructed and arranged relative to the riser drain outlet, that rise of the drainage in the reservoir is stopped at an ample distance downward from said drain outlet, for beginning of discharge of the drainage up out of the reservoir, said intermediate means comprising an enclosure and means whereby said float either admits or else excludes and allows escape of part of the fluid under raised pressure to or from said enclosure, and a movable member in said enclosure, operatively related to said valve whereby the fluid admitted moves said member to close said valve, and whereby exclusion and escape of the fluid allows a further part of the fluid under raised pressure to act on said movable member to close said valve, said apparatus comprising disposal means separate and distinct from the riser, whereby the drainage is conducted upwardly to the exterior of the apparatus without intermixing of the drainage with the water in the riser.

5. Water service apparatus comprising a riser and means below ground level for admitting water under raised pressure to the apparatus to be passed upward through the riser for use and comprising a reservoir below the ground level, the riser having a drain outlet through which drainage passes from the riser down into the reservoir for storage between uses of the apparatus, forcing means operated by fluid under raised pressure to displace the drainage upward from the reservoir, control means to cause starting and stopping of said forcing means, said control means comprising a valve opened or closed to respectively admit or exclude the above mentioned forcing fluid under raised pressure to or from the force exerting means, a float, and intermediate means operatively relating said float to said valve, so constructed and arranged relative to the riser drain outlet that rise of the drainage in the reservoir is stopped at an ample distance downward from said drain outlet, for beginning of discharge of the drainage up out of the reservoir, said intermediate means comprising a cylinder and means whereby said float either admits or else excludes and allows escape of part of the fluid under raised pressure to or from said cylinder, and a plunger movable in said cylinder, operatively related to said valve whereby the fluid admitted moves said plunger to close said valve and whereby exclusion and escape of the fluid allows a further part of the fluid under raised pressure to act on said plunger to open said valve, said apparatus comprising disposal means separate and distinct from the riser whereby the drainage is conducted upwardly to the exterior of the apparatus without intermixing of the drainage with the water in the riser.

6. Water service apparatus comprising a riser and means below ground level for admitting water under raised pressure to the apparatus to be passed upward through the riser for use and comprising a reservoir below the ground level, the riser having a drain outlet through which drainage passes from the riser down into the reservoir for storage between uses of the apparatus, forcing means operated by fluid under raised pressure to displace the drainage upward from the reservoir, control means to cause starting and stopping of said forcing means, said apparatus comprising disposal means separate and distinct from the riser whereby the drainage is conducted upwardly to the exterior of the apparatus without intermixing of the drainage with the water in the riser, the forcing means including elements between which is a restricted space through which the fluid passes when being forced upward by said forcing means, at relatively high speed through the disposal means, said disposal means having a drain outlet independent of passage of the water through said restricted space, a closure for said drain outlet, and means operatively relating said closure to the above mentioned control means whereby said closure is closed when the control means acts for starting said forcing means, and is opened when the control means acts for stopping said forcing means.

7. Water service apparatus comprising a casing to fit down in the ground, having a bottom whereby it forms a reservoir, a riser having an inlet down in said casing and extending upward out of said casing and disposed to discharge water at its upper end for use, and having a drain port down in said casing, valves alternately opening and closing said inlet and said drain port, means for operating said valves, a drain pipe extending upward out of said casing, forcing means arranged to receive water from said casing and force the received water up through said drain pipe, means for supplying water under pressure to said riser when its inlet valve is open, a control valve which when open admits part of said water under raised pressure to said forcing means to operate said forcing means, and when closed excludes the operating water from said forcing means, a float in said casing, and intermediate means operatively relating said float to said control valve to open said control valve upon rise of the float as drainage water enters the casing and to close said control valve upon fall of said float as the drainage water is forced by said forcing means up in and out of said drain pipe, said intermediate means comprising a cylinder on an upright axis, a plunger sliding up and down in said cylinder and operatively related to the control valve, and a shifter valve operated by the float when lowered to confine water under pressure to said plunger and to hold the control valve closed, and by the float when elevated to release the confined water and allow the water that was confined under raised pressure by the control valve, to flow to and operate the forcing means to raise the water through the drain pipe as set forth herein, said apparatus comprising a pipe through which the water under raised pressure is supplied to the forcing means under control of said control valve, the herein mentioned casing being substantially cylindrical on an upright axis, and the riser structure, the float structure, the cylinder structure, and the forcing means and drain pipe structure thus being spaced around said axis close thereto, with the casing walls extending around these structures close thereto, allowing minimum diameter of the apparatus, with the supply pipe from the forcing means entering the casing through one of its side walls and having branches to the riser and the forcing means.

8. Water service apparatus comprising a source of water under pressure, a riser and means for controlling flow of said water to said riser, said riser having a port for drainage of residue water therefrom, a reservoir to receive the drained water, a drain pipe extending up from said reservoir, water driven forcing means in discharging relation to said drain pipe and in receiving relation to said reservoir, and control means for operative relation to drain water in the reservoir whereby rise and fall of said water respectively admits water to or excludes water from said forcing means, said control means comprising a float, a chamber containing said float, receptive of water from the reservoir at its upper part, and a syphon discharging the water from the float chamber as the water falls in the reservoir.

JOHN T. McGARRY.

REFERENCES CITED

The following references are of record in the file of this patent:

UNITED STATES PATENTS

| Number | Name | Date |
|---|---|---|
| 318,185 | Haydn | May 19, 1885 |
| 824,770 | Williams | July 3, 1906 |
| 1,216,815 | Kelly | Feb. 20, 1917 |
| 1,521,745 | Becker | Jan. 6, 1925 |
| 1,577,142 | Mueller | Mar. 16, 1926 |
| 2,017,767 | Norman | Oct. 15, 1935 |
| 2,326,804 | Sigmund | Aug. 17, 1943 |

FOREIGN PATENTS

| Number | Country | Date |
|---|---|---|
| 7,520 | Germany | of 1879 |
| 25,159 | Germany | of 1883 |
| 91,658 | Switzerland | of 1921 |